W. J. ROLLINS.
DIRIGIBLE AUTOMOBILE HEADLIGHT.
APPLICATION FILED APR. 4, 1918.
1,284,457.
Patented Nov. 12, 1918.
2 SHEETS—SHEET 1.
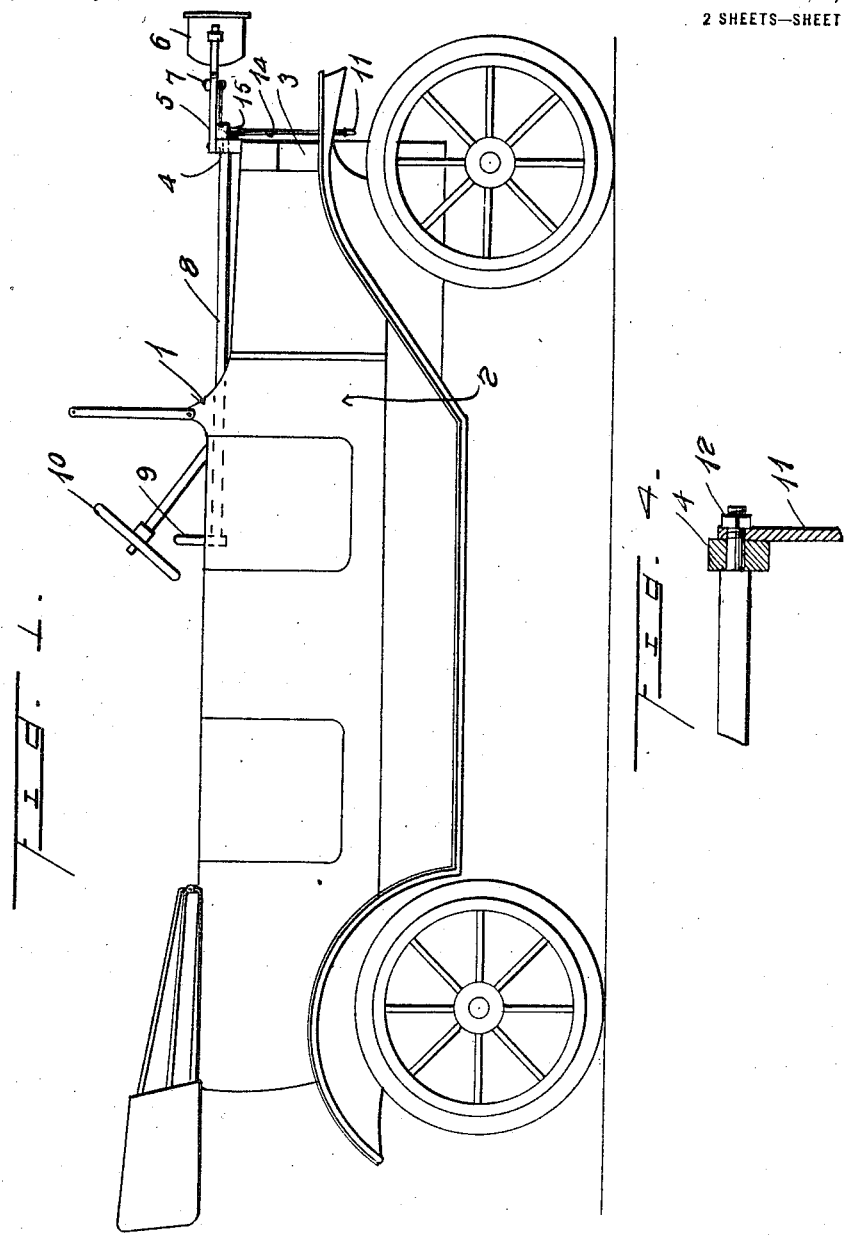
Witnesses
Inventor
W. J. Rollins.

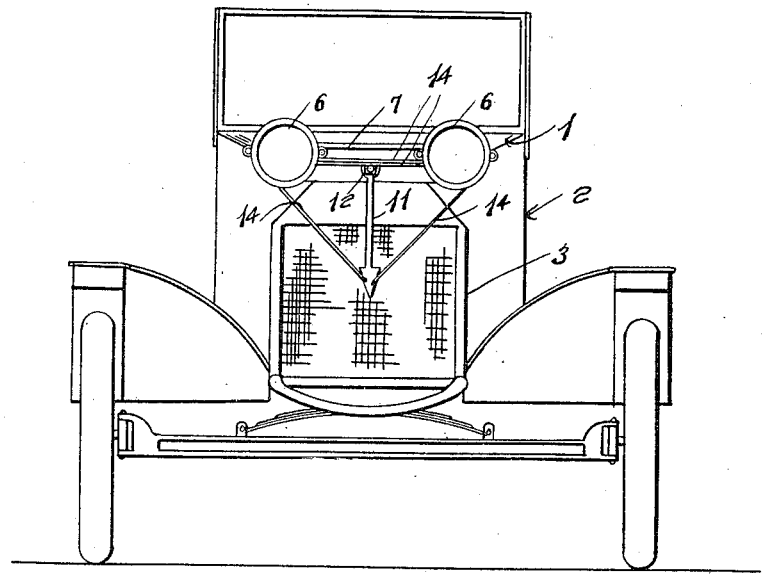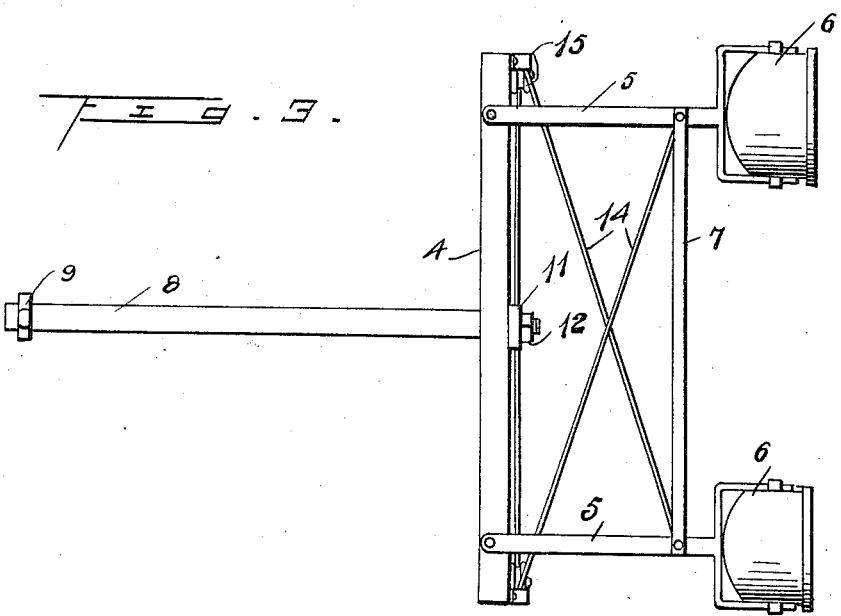

UNITED STATES PATENT OFFICE.

WILLIAM J. ROLLINS, OF MOORE, OKLAHOMA.

DIRIGIBLE AUTOMOBILE-HEADLIGHT.

1,284,457.   Specification of Letters Patent.   Patented Nov. 12, 1918.

Application filed April 4, 1918. Serial No. 226,664.

*To all whom it may concern:*

Be it known that I, WILLIAM J. ROLLINS, a citizen of the United States, residing at Moore, in the county of Cleveland and State of Oklahoma, have invented certain new and useful Improvements in Dirigible Automobile-Headlights; and I do hereby declare the following to be a full, clear, and exact description of the invention, such as will enable others skilled in the art to which it appertains to make and use the same.

This invention relates to dirigible headlights for automobiles and has for one of its objects the provision of a device of this character, whereby the headlights can be turned laterally of the automobile in either direction to direct the rays of light therefrom in the path of the front wheels of the automobile when traveling upon a curve and also can be used for reading or illuminating signs along the sides of the road.

Another object of this invention is the provision of means for pivotally supporting the headlights of the automobile and having means connected thereto whereby the operator of the automobile can turn the headlights laterally of said automobile in either direction to illuminate curves in roadways and also can use the headlights as a signal to indicate to traffic in which direction a turn is to be made.

A still further object of this invention is the provision of dirigible headlights for automobiles of the above stated character, which shall be simple, durable and efficient, and which may be manufactured and sold at a comparatively low cost.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which:—

Figure 1 is a side elevation of an automobile illustrating dirigible headlights applied thereto and constructed in accordance with my invention, Fig. 2 is a front elevation of the same, Fig. 3 is a plan view of the dirigible headlights and the manner of operating the same detached from the automobile, Fig. 4 is a fragmentary sectional view showing means of connecting the swinging arms to an operating shaft.

Referring in detail to the drawings, the numeral 1 indicates as an entirety, an ordinary automobile having the usual body 2, and radiator 3. The foregoing description relates to a well known construction of automobile and to which my invention is applied.

A transverse bar 4 is secured to the top of the radiator 3 in any well known manner and has pivoted to each end forwardly extending arms 5 carrying at their forward ends ordinary headlights 6. A rod 7 has each end pivoted to the arms 5 adjacent their forward ends to cause said arms to move in corresponding directions with each other.

An operating shaft 8 is journaled in the transverse bar 4 intermediate its ends and in the body 2 of the automobile and has secured to one end a hand grip 9 located in close proximity to the steering wheel 10 of the automobile so that the operator may turn the shaft 8 in either direction.

A downwardly depending rod or arm 11 is secured to the forward end of the shaft 8 by means of a nut 12. The arm 11 extends downwardly in front of the radiator as clearly illustrated in Fig. 2 and has connected thereto cables 14 which extend in opposite directions over pulleys 15 journaled to each end of the bar 4 and are connected to the outer ends of the arms 5 and intercross each other as clearly illustrated in Fig. 3 so that upon moving the hand grip 9 in one direction, the headlights will be moved in a corresponding direction and vice versa when the hand grip is moved in the opposite direction.

While I have shown and described the preferred embodiment of my invention, it will be understood that minor changes in construction, combination, and arrangement of parts may be made without departing from the spirit and scope of the invention as claimed.

What I claim as new is:—

A dirigible headlight for automobiles comprising a transverse member, arms pivoted to said member, headlights carried by said arms, means connecting said arms together, an operating shaft journaled to the automobile, an arm secured to said operating shaft, pulleys journaled to the ends of said transverse member, flexible elements connected to the second named arm and passing over said pulleys and intercrossed and connected to the arms for swinging said arms laterally in either direction.

In testimony whereof I affix my signature in presence of two witnesses.

WILLIAM J. ROLLINS.

Witnesses:
R. D. WEST,
S. MAHLER.